(12) United States Patent
Yuxin et al.

(10) Patent No.: US 9,292,092 B2
(45) Date of Patent: Mar. 22, 2016

(54) INTERACTIVE DISPLAY SYSTEM WITH COLLABORATIVE GESTURE DETECTION

(75) Inventors: Liu Yuxin, Cupertino, CA (US); Chang Liang An Nelson, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1307 days.

(21) Appl. No.: 12/682,235

(22) PCT Filed: Oct. 30, 2008

(86) PCT No.: PCT/US2008/081879
§ 371 (c)(1),
(2), (4) Date: Apr. 8, 2010

(87) PCT Pub. No.: WO2009/059065
PCT Pub. Date: May 7, 2009

(65) Prior Publication Data
US 2010/0207874 A1    Aug. 19, 2010

Related U.S. Application Data

(60) Provisional application No. 60/983,625, filed on Oct. 30, 2007.

(51) Int. Cl.
| G06F 3/01 | (2006.01) |
| G06K 9/00 | (2006.01) |
| G06Q 30/02 | (2012.01) |
| G09F 27/00 | (2006.01) |

(52) U.S. Cl.
CPC ............ *G06F 3/017* (2013.01); *G06K 9/00355* (2013.01); *G06Q 30/02* (2013.01); *G09F 27/00* (2013.01)

(58) Field of Classification Search
USPC ......................................................... 345/156
See application file for complete search history.

(56) References Cited

U.S. PATENT DOCUMENTS

| 6,704,024 B2 | 3/2004 | Robotham |
| 7,039,676 B1 | 5/2006 | Day et al. |
| 7,225,414 B1 * | 5/2007 | Sharma et al. ................. 715/863 |
| 7,274,803 B1 | 9/2007 | Sharma et al. |
| 2002/0015042 A1 | 2/2002 | Robotham |
| 2002/0015064 A1 | 2/2002 | Robotham et al. |
| 2008/0013826 A1 * | 1/2008 | Hillis et al. ................... 382/154 |

FOREIGN PATENT DOCUMENTS

| WO | WO/02/13176 | 2/2002 |
| WO | WO/02/19081 | 3/2002 |

* cited by examiner

*Primary Examiner* — Amare Mengistu
*Assistant Examiner* — Sarvesh J Nadkarni
(74) *Attorney, Agent, or Firm* — HP Inc Patent Department

(57) ABSTRACT

An interactive content delivery system (10) includes means for displaying visual content (20) to a group of individuals (14), means for detecting a collective gesture (12) of the group, and a control system (26), coupled to the means for displaying visual content (20) and the means for detecting a collective gesture (12). The control system (26) is configured to modify the content in response to the collective gesture.

10 Claims, 4 Drawing Sheets

INTERACTIVE DISPLAY SYSTEM WITH COLLABORATIVE GESTURE DETECTION

BACKGROUND

For digital signage in public places, it is desirable to provide interesting and attractive display systems that can capture and hold the attention of an audience. Most often, public advertising and displays are "open looped" and provide no direct feedback regarding their effectiveness in drawing attention. Instead, content providers and advertisers provide display content that they believe will appeal to the desired audience, but can generally only gauge its success indirectly, such as through sales figures, opinion polls, focus groups, etc. Additionally, public display systems generally provide little or no way for audience members to interact with the system or with other audience members.

BRIEF DESCRIPTION OF THE DRAWINGS

Various features and aspects of the present disclosure will be apparent from the detailed description which follows, taken in conjunction with the accompanying drawings, which together illustrate, by way of example, features of the present disclosure, and wherein.

DETAILED DESCRIPTION

Figure 1:
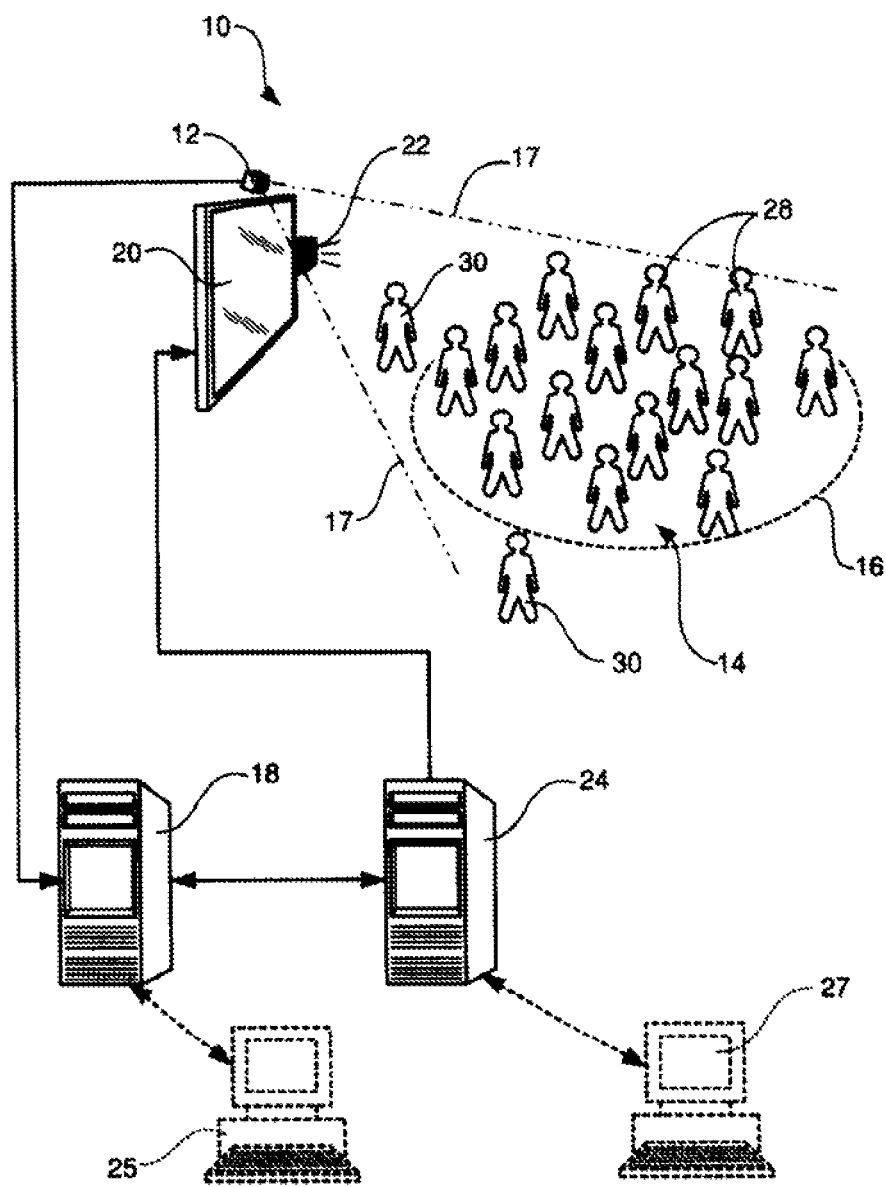
FIG. 1 is a semi perspective, semi schematic diagram of one embodiment of an interactive display system with collaborative gesture detection.

Reference will now be made to exemplary embodiments illustrated in the drawings, and specific language will be used herein to describe the same. It will nevertheless be understood that no limitation of the scope of the present disclosure is thereby intended. Alterations and further modifications of the features illustrated herein, and additional applications of the principles illustrated herein, which would occur to one skilled in the relevant art and having possession of this disclosure, are to be considered within the scope of this disclosure.

For digital signage in public venues, it is important to create compelling experiences that can repeatedly captivate the attention of an audience. As noted above, the detection and identification of audience responses to a display or advertisement can provide valuable feedback for a content provider regarding the quality and appeal of the content to its audience. Such feedback can also be used to allow dynamic modification of the display content.

This disclosure presents embodiments of a system and method for detecting collaborative gestures of an audience using vision-based technologies to enable interactivity for digital signage and other applications. In one embodiment, the present system and method detects collaborative gestures, instead of detecting one single gesture or two or more competitive or even independent gestures, and uses these as feedback for an audio-visual display system.

One embodiment of an interactive display system 10 with collaborative gesture detection is shown in FIG. 1. The system includes at least one imaging device 12 (e.g. a camera) pointed at an audience 14 (located in an audience area 16 that represents at least a portion of the field of view of the imaging device), and a video camera computer 18, interconnected to the imaging device and configured to run gesture detection and recognition algorithms. The video camera computer is a video image analysis computing device that is configured to analyze visual images taken by the imaging device. The imaging device can be configured to take video images (i.e. a series of sequential video frames that capture motion) at any desired frame rate, or it can take still images. The term "video camera computer" is used to refer to the computing device that is interconnected to the imaging device, and is not intended to limit the imaging device to a camera per se. A variety of types of imaging devices can be used. It should also be recognized that the term "computer" as used herein is to be understood broadly as referring to a personal computer, portable computer, content server, a network PC, a personal digital assistant (PDA), a cellular telephone or any other computing device that is capable of performing the functions necessary for receiving input from and/or providing control or driving output to the various devices associated with the interactive display system.

The imaging device 12 is positioned near a changeable display device 20, such as a CRT, LCD screen, plasma display, LED display, projection display (front or rear projection) or other type of display device. For a digital signage application, this display device can be a large size public display, and can be a single display, or multiple individual displays that are combined together to provide a single composite image in a tiled display. This can include one or more projected images that can be tiled together or combined or superimposed in various ways to create a display. An audio broadcast device, such as an audio speaker 22, can also be positioned near the display to broadcast audio content along with the video content provided on the display.

The system shown in FIG. 1 also includes a display computer 24 that is interconnected to provide the desired video and audio output to the display 20 and the audio speaker 22. As shown in FIG. 1, the video camera computer 18 can be interconnected to the display computer 24, allowing feedback and analysis from the video camera computer to be used by the display computer. The display computer can also provide feedback to the video camera computer regarding camera settings to allow the change of focus, zoom, field of view, and physical orientation of the camera (e.g. pan, tilt, roll), if the mechanisms to do such are associated with the camera. The camera computer 18 can include an input/output device 25, having a keyboard, monitor, and other input and output devices (e.g. computer mouse, etc.) for allowing direct input and output of data to and from the camera computer. Similarly, the display computer 24 can also include an input/output device 27 for allowing direct control of the display 20.

Figure 3:
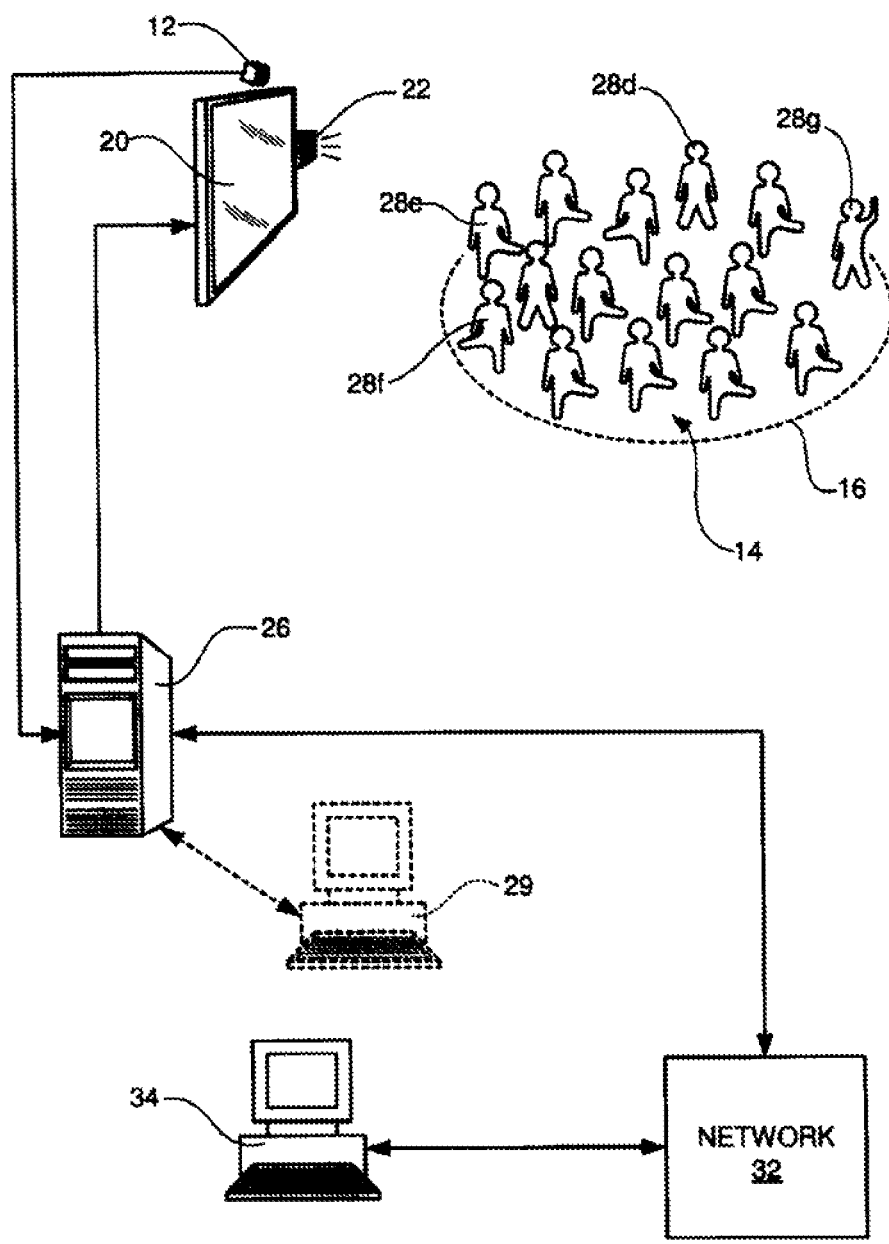
FIG. 3 is a diagram of another embodiment of an interactive display system with collaborative gesture detection, showing audience members generally collaborating in another gesture.

It is to be understood that a single computer can be used to control both the imaging device 12 and the display 20. Such a configuration is shown in FIG. 3, wherein a single computer 26 is interconnected to both the imaging device 12 and the display device 20. This single computer can be programmed to handle all functions of video image analysis and control of the imaging device, as well as controlling output to the display. As with the dual computer controller configuration shown in FIG. 1, this single computer controller can also include an input/output device 29 for allowing direct control of and feedback to/from the system.

Figure 2:
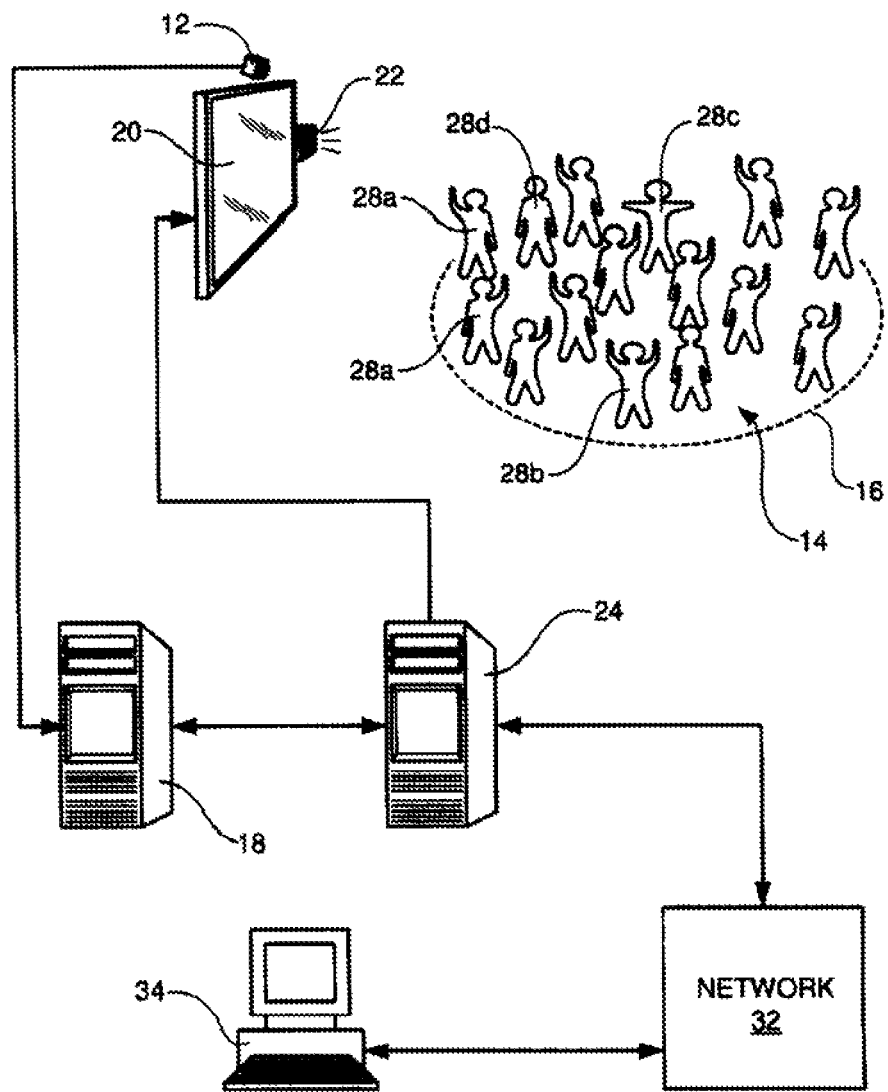
FIG. 2 is a diagram of another embodiment of an interactive display system with collaborative gesture detection, showing audience members generally collaborating in a given gesture.

Additionally, the computer controller can be a network or part of a network, such as a local area network (LAN), or it can be interconnected to a network. For example, as shown in FIG. 2, the display computer 24 can be interconnected to a network 32, which provides an interconnection to a remote computer system 34. Alternatively, the combined controlling computer 26 shown in FIG. 3 can also be interconnected to the network and thus to one or more remote computer systems 34. The network 32 can be a local area network (LAN), or any other type of computer network, including a global web of interconnected computers and computer networks, such as the Internet. The network connection allows the remote computer to receive input from the controller for the interactive display system, and also to provide control commands and other output to it.

The controller can be any type of personal computer, portable computer, or workstation computer that includes a processing unit, a system memory, and a system bus that couples the processing unit to the various components of the computer. The processing unit may include one or more processors, each of which may be in the form of any one of various commercially available processors. Generally, each processor receives instructions and data from a read-only memory and/or a random access memory. The controller can also include a hard drive, a floppy drive, and CD ROM drive that are connected to the system bus by respective interfaces. The hard drive, floppy drive, and CD ROM drive contain respective computer-readable media disks that provide non-volatile or persistent storage for data, data structures and computer-executable instructions. Other computer-readable storage devices (e.g., magnetic tape drives, flash memory devices, and digital versatile disks) can also be used with the controller.

The imaging device 12 is oriented toward an audience 14 of individual people 28, who are gathered in the audience area, designated by outline 16. While the audience area is shown as a definite outline having a particular shape, this is only intended to represent that there is some area near the imaging device 12 in which an audience can be viewed. The audience area can be of a variety of shapes, and can comprise the entirety of the field of view of the imaging device, or some portion of the field of view. For example, some individuals 30 in FIG. 1 can be near the audience area and perhaps even within the field of view of the imaging device, and yet not be within the audience area that will be analyzed by the vision recognition system.

In operation, the display 20 (and the audio speaker 22) provides visual and/or audio-visual content to the audience. The content can be in the form of commercial advertisements, entertainment, political advertisements, survey questions, or any other type of content. This content can include suggestions, requests, or other types of prompts for audience response in the form of some gesture. These requests or prompts are for group responses. The gesture requested can be a certain motion of the body, including relatively subtle motions, such as a smile, facial gesture or nod of the head, to more obvious gestures, such as raising or waving a hand, or moving the entire body in some way, such as in a dance or exercise movement. It will be apparent that there are many types of gestures that can be prompted and recognized.

Examples of certain group gestures that the system can recognize are depicted in FIGS. 2 and 3. In these examples, prompts for particular gestures are used. However, prompts need not be used, and detected gestures or behavior can be discerned and appropriate feedback taken. As one example, in FIG. 2 the group 14 has been prompted to raise a hand in response to some query provided by the display system. Whenever the system prompts a group response, several results are possible. Most of the participants are likely to respond in the manner requested and raise one hand, these group members being indicated at 28a. However, some participants may provide an alternate, though potentially qualifying response, such as by raising two hands. Such an individual is indicated at 28b.

Other audience members may respond with an ambiguous or improper response, such as the individual 28c that is holding both arms out horizontally. Finally, some audience members may give no response at all, such as the individual 28d. A visual image of the audience response is taken by the imaging device 12, and is analyzed by the image analysis computer 18.

Vision based gesture detection and recognition have been widely studied in the past decade. Vision-based detection captures an audience's view via image-processing techniques such as background subtraction, silhouette detection, etc., in order to detect and classify specific gestures. For example, audience participants positioned near the imaging device can collectively perform some type of individual gesture (e.g. raise a hand) in response to the content, or they can perform a collaborative gesture, such as a group dance movement. Alternatively, audience participants can line up in a specified way or work together in some other way.

Using group gesture detection techniques that have been developed, the image analysis that the system performs can function in at least two basic ways. One mode of operation of the system is to measure the level of audience interest as a function of the audience response (e.g. looking for a majority response). For example, the simultaneous raise of many hands in the audience can be detected and regarded as a highly positive feedback to the displayed content. For example, if the prompt provided to the audience in FIG. 2 related to a choice between alternatives for subsequent content, and the system were programmed to provide content based upon a majority vote of the audience, the audience gestures shown in FIG. 2 would suggest that 12 out of the 15 audience members approved of a particular option that was then being offered. The displayed content can then be adapted or modified based upon this majority vote to provide content indicated by the audience response, and hopefully further captivate the audience's attention.

A second way that the system can perform is to prompt the involvement of many individuals to interact with the display system to escalate the level of interactivity. For example, an audience can be prompted to simultaneously emulate or mimic a specific gesture indicated by the displayed content. An example of such interaction is shown in FIG. 3. In this figure the audience 14 can be performing a group dance or exercise motion or routine, mimicking motions that are simultaneously shown on the display 20. If the routine requires that each audience member be standing on one particular leg at the moment shown in the figure, it can be seen that some audience members 28e are performing the action properly, other members 28f are performing the basic motion in reverse, some audience members 28g are performing an entirely different motion, and still other members 28d are not performing at all.

While there is likely to be some variation in audience response, the assumption is that group is acting together to some extent, providing a collaborative response to the displayed content. The terms "collaborative gesture" or "group gesture" or "collective gesture" refer to those gestures by multiple individuals that present a sufficient level of relationship or similarity, or those following a certain type of indication provided by the digital signage system, or those falling into a predefined gesture candidate class. For example, the audience can be informed or may know in advance a desired collaborative gesture(s) that will elicit some response, or the system can be configured to allow the audience to discover such gesture(s).

The collaborative gestures to be detected are not limited to human hands, but can include the movement of one's head, torso, leg, foot, or other body part, as well as facial expressions. The gestures can also involve physical motions, or change of bodily orientation, such as turning to the left or to the right, or moving towards or away from the display device. In essence, collaborative gestures refer to those gestures that the audience has presented as a group behavior, rather than as individual behavior. Other examples include detecting sophisticated body movements such as a large number of audience members performing jumping jacks or other dance-like movements to trigger and/or control some event(s). One example of this concept is a group dance competition or Tai-Chi contest that awards every audience member a "prize" if enough audience members perform (e.g. dance to the beat) well enough. Additionally, the content of the display can include a prompt requesting competing common group gestures from at least two subgroups of the group. For example, the display system can prompt a first half of the group to perform some dance or exercise motion, then prompt the other half of the group to perform the same motion, and then rate the two performances relative to each other. Other variations are also possible.

Collaborative gestures can include the same or similar movement performed by one or more people, and can also include coordinated and complementary gestures. For example, rather than every audience member pointing in a common direction, the audience can be prompted to point toward a common location, which provides an image in which the apparent direction of pointing by each individual varies depending upon the location of the individual because of perspective differences. As another example of collaborative but varying motion, an audience can be prompted to perform a rising and falling "wave" motion, like that frequently done by audiences at sporting events. Collaborative gestures can provide the mechanism to allow multiple user interactivity simultaneously.

In this system, the visual analysis system detects the collaborative or collective gestures to collect the audience response from a large crowd, rather than recognizing distinct gestures of individuals, or merely competitive gestures, as are detected for video games and the like. Rather than taking a response from one single individual and leaving the rest of the audience (e.g. the majority) passively ignored, in this system the entire audience is encouraged to coordinate with each other through collaborative gestures to form a group that interacts with the system. The system is designed to respond to the group behavior, instead of each distinct individual behavior. In this way many individuals in an audience can interact with the system simultaneously and cooperatively. This system thus provides a new mechanism for a crowd to interact with a digital signage or other content delivery system. The capability for group interaction is useful for a digital signage system so that the audience can become actively involved, potentially increasing advertising and business opportunities and creating greater audience draw and word-of-mouth interest.

In the system and method disclosed herein, because of the many individuals present in the audience, a control point can be established based upon a number of individuals who present the prompted collaborative gesture. That is, instead of setting up many control points, each based upon a single individual at a time, many more audience members can get involved in controlling or providing feedback to the system based upon a single collective control point. For example, hand gestures can be detected and used to manipulate a single control point on the display, in a manner similar to the way in which a computer mouse is used to control a cursor. By measuring collaborative behavior, this approach allows multiple users to manipulate the control point simultaneously, rather than one control point per individual, without causing conflicts. The control point can be triggered by the collaborative gestures of multiple individuals. In this case, the collaborative gestures can be hand gestures that can concurrently follow similar motion patterns detected in the audience.

Figure 4:
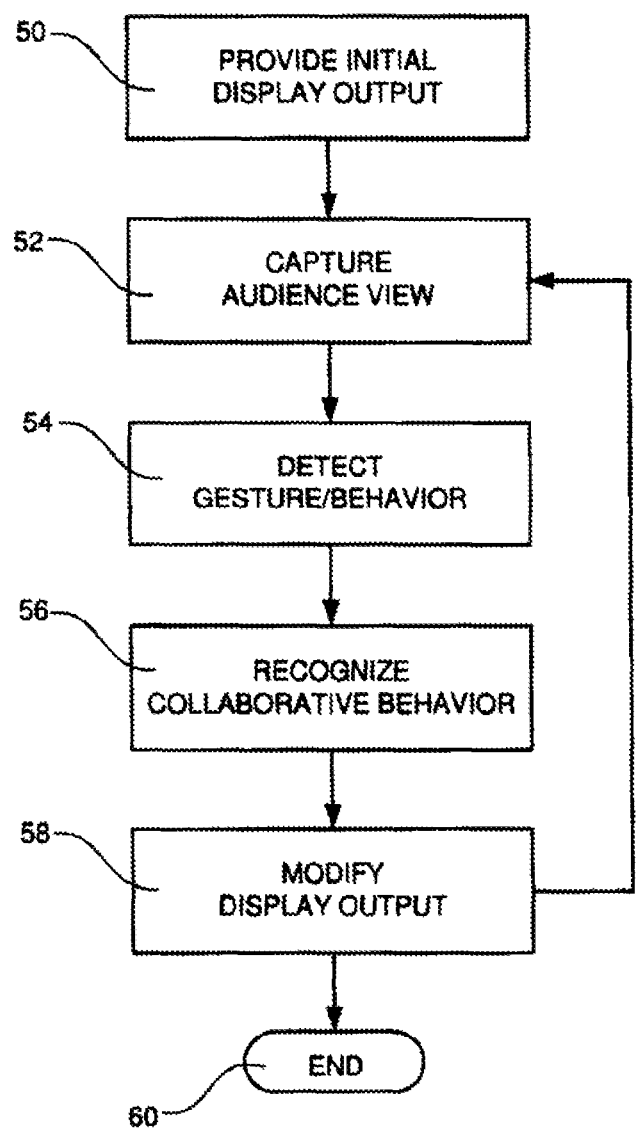
FIG. 4 is a flow chart showing the steps in one embodiment of a method for collaborative gesture detection in an interactive display system.

The steps involved in one embodiment of the interactive content delivery system with collaborative gesture detection are outlined in FIG. 4. To start the process, the System first provides some initial display output (step 50). As noted above, this content can be in the form of commercial advertisements, entertainment, political advertisements, survey questions, or any other type of content. This content can include overt suggestions, requests, or other types of prompts for audience response in the form of some gesture. On the other hand, the content can also include covert or subconscious prompts or triggers for response. In the first case, the content expressly instructs or requests the audience to make a particular gesture. In the latter case, the content can be crafted so that particular gestures, such as a smile, are likely (e.g. by presenting humorous content), but the content does not expressly instruct the audience to make the gesture. In other examples, the content can comprise no prompts, explicit or covert, and simply categorize the detected gestures against one or more pre-determined patterns of gesture/behavior. This can be useful for validating expectations of reactions against actual reactions.

Once some display output is provided, the system then captures an audience view with the imaging device(s) (step 52). This step can involve capturing a single snapshot or a series of frames/video. It can involve capturing a view of the entire camera field of view, or only a portion of the field of view (e.g. a region, only black/white vs color, etc). Additionally, it is to be understood that multiple imaging devices can be used simultaneously to capture video images for processing.

The next step is to detect the group gesture or behavior (step 54). For example, this can be done by detecting multiple individual gestures. This is the first part of the image processing step. Using vision recognition systems that have been discussed above, the system can detect one or more pre-determined patterns of gesture/behavior. The gesture or behavior that is detected can be a facial expression, a motion, or some other type of gesture. It should also be noted that it can be desirable to pre-calibrate the imaging device(s) to simplify the image processing step. For example, a multi-camera embodiment can be used in conjunction with techniques known in computer vision to solve for the epipolar geometry between cameras and reduce motion estimation down to a simpler 1-D search. Other types of pre-calibration procedures can also be performed.

A variety of computer vision and image processing techniques may be performed either sequentially or in parallel to analyze the captured image data. For example, low-level detection algorithms such as foreground/silhouette extraction and background subtraction may first be formed to identify the sufficiently large and moving contiguous regions in the scene. The algorithms then proceed to track over time and adjust these regions to conform with the captured data. Other detection algorithms may be present to help identify simpler gestures/behaviors that together form a much more sophisticated one. These might include detectors for face, expression (e.g. smile, frown), body part (head, hand, torso, arm, leg, foot, etc). The system can then detect the gesture or behavior based on one or more of these simpler detectors. For example, a jumping jack motion could be broken down into a range of expected motions for two arms and two legs, as well as a torso that moves up and down.

Alternatively, the system can be configured not to require sophisticated gesture recognition algorithms at all. Instead, the vision-based system can be configured to identify whether there is a correlation between multiple gestures that have been present between multiple people. The collaborative gesture may include simultaneous gestures or symmetric gestures, for example. The non-rigidity of the human body and the variety of appearance affects the accuracy and effectiveness of gesture recognition. Consequently, there is often a trade-off between simplicity of the recognition program and its accuracy. One way to approach this trade-off is to create a predefined set of collaborative gestures to be recognized from an audience, with vision characteristics of these stored in memory in the system controller, thereby reducing the level of complexity of the vision recognition system.

The next step in the method is to recognize the collaborative behavior (step 56). This step can include aggregating or correlating the results or detecting similarity in gestures to recognize collaborative gestures/behaviors. In this step the system analyzes the input data and computes scores based on various detectors to rank the probability of the appearance of one or more collaborative gestures/behaviors. There are many examples of such collaborative gestures. One type of collaborative gesture can be the raising of hands in the audience, and detecting this gesture using gesture recognition technologies. This can include the raise of one hand or two hands to deliver feedback from the audience regarding the displayed content, or a finger pointing gesture performed by multiple people at the same time. This scenario can be similar to the "majority vote" approach, in which the number of raised hands is counted and considered as the voting behavior. It is to be understood that raised hands are just one of many collaborative gestures that can be considered. For example, the detection of raised hands could be considered together with the detection of facial expression and motion detection to obtain a more precise measurement of an audience response to the displayed content. Moreover, the system can be configured to not merely tabulate a simple majority vote. For example, the system can be configured to compute a score or rating, such as a score on a scale of from 0-10, as a rating or measure of the relative quality of the gesture. For example, the score can indicate the strength of positive (or negative) feedback from the audience. Alternatively, the score can be a qualitative judgment of the collaborative behavior itself, such as a rating of a dance or exercise performance or some other competitive activity.

Many other types of gestures can also be aggregated or correlated. For example, facial expressions can be detected to focus on, for example, smiling faces in the audience. The system can focus on all smiling faces as a collaborative gesture at some specific instant. The number of smiling faces, the duration of each smiling face, as well as the extent of the smile can be detected using face vision technologies, and the results can then be aggregated to make a decision. This type of collaborative gesture can be used to provide feedback regarding the content on the display (e.g. to evaluate the quality of the content that triggered the smile in the audience), or it can be used as a control mechanism to allow modification or adaptation of the content, as discussed more below.

Object detection and tracking techniques can also be used to detect and track motion trajectories for each individual in a crowd. After an individual motion has been detected, the analysis can focus on the direction and velocity of the motion across all the motion trajectories. For example, the collaborative gesture can refer to motions that follow a common or similar trajectory, direction and/or velocity. The system can also be configured to adapt content based on the number of motion trajectories that follow a particular velocity, direction or trajectory of motion.

Based upon the recognized behavior, the system can take any of several actions. In one embodiment, the system can modify the display output based upon the collective behavior (step 58). This can involve triggering one or more outputs from the display computer (24 in FIG. 1) based on the detected gesture. To form an interactive system, an input from the audience usually translates into some sort of output. For example, through the detection of collaborative gestures, a digital display might be updated and/or controlled. Collaborative gestures are possible to be presented by a crowd in the audience if a certain type of indication is provided by the displayed content for the audience to easily repeat and mimic. The response has to be implemented by a group of people rather than one single distinct individual. Advantageously, the displayed content can guide the audience in an intuitive way to perform the collaborative gestures. The system may count the number of individuals that are in the audience whoever follows the designated gesture, and the content can be adapted by the number of such individuals. In this and other ways the collaborative gesture can operate as a selecting action for alternative content.

In addition to or as an alternative to modifying the display content, the collaborative behavior can be evaluated as feedback regarding the content or effectiveness of the display content. This allows the system to provide a direct indication of the effectiveness or impact of advertising, entertainment, political messages, etc. Again, the feedback can be in the form of a simple yes/no indication, or it can be a more relative measure of effectiveness, such as an impact score as a distribution or percentage (e.g. 14% very positive reaction, 20% positive reaction, 23% negative reaction, 15% very negative, 28% no discernable reaction).

At this point the process can repeat itself. The modified display content can include a prompt for collaborative action on the part of the audience. In that case, the system again captures an audience view (step 52) and analyzes that view to determine what subsequent change to make in the display content. This process can repeat as many times as desired until there are no more collaborative gestures to detect (step 60). Nevertheless, the process can be started over again at any time.

The present disclosure thus presents embodiments of a system and a method for visually detecting group gestures in connection with a digital signage system or other content delivery system, to enable group interaction. The system can collect a response from an audience (e.g. a majority response, or multiple simultaneous collaborative gestures) to displayed content and measure the level of audience interest. The displayed content can then be adapted to further captivate audience attention. Alternatively, many individuals can interact with the display system to increase the level of interactivity, such as having an audience simultaneously mimic or emulate a specific gesture indicated by the displayed content. A control point can be established by the number of individuals who present the collaborative gesture, instead of setting up the control point by a single individual at a time. Hence many more audience members can get involved in controlling the system or providing feedback.

Embodiments of the present invention can be used for motivating coordinated action by the audience. For example, the display can instruct and guide the audience to mimic a certain action. In this context, collaborative gestures can be viewed as a type of sign language. The gestures indicate a special event motivated by the audience to collaborate with each other. Collaborative gesture involves the intentional collaboration or cooperation between two or more people. As an example, the display content can include instructions to perform or a demonstration of a certain movement, and the audience can simply imitate what has been demonstrated or do what has been instructed. There can also be some content to create which involves the collaborative gesture to implement the task that has been designated by the content. For example, the audience can be prompted to move a virtual object shown on the display in a manner that requires more than two hands to complete the task. Embodiments of the present invention can also be used to prompt, detect, and evaluate collaborative gestures from multiple audiences in different locations. For example, multiple interactive display systems with collaborative gesture detection can be provided at different geographical locations and interconnected in a network. With this type of system, the collaborative gestures or actions of audiences at different locations can be combined or analyzed together.

The present invention has numerous advantages. It leverages novel collaborative gesture detection as a new interactivity mechanism for digital signage applications to create a compelling experience for the audience. The proposed interactivity mechanism is deliberately designed to take the response from multiple users in collaboration and/or coordination and rewards the involvement of multiple users. For example, in one embodiment the system detects gestures from multiple individuals regardless of their appearance (e.g. height, weight, shape, apparel, etc) and identifies the relationship (e.g. similarities) among these gestures present from different individuals. The system counts the number of users that present the collaborative gestures and then delivers an appropriate response based on the number of users (e.g. the content could be updated as a result of the coordination of many individuals). In the end, it attempts to capture more of the audience's attention and enables group behavior interactivity between the signage system and the large crowd of users.

In addition, system embodiments can be less complex and thus require less sophisticated hardware to implement than other visual recognition or gesture detection systems. Typical gesture recognition is a complicated task that involves motion detection, motion modeling, motion analysis, pattern recognition, and machine learning, whereas collaborative gesture detection can be a much easier task to implement. The detection of collaborative gestures does not need to explicitly recognize human gestures. Rather, it needs only to detect whether there exists two or more gestures that are related to each other, therefore simplifying the technical challenges.

While the above discussion has focused primarily on digital signage applications, the ideas of collaborative gesture detection can also be extended to other applications not requiring a large display. For example, collaborative gesture detection can be used to evaluate, measure, or judge a collaborative activity or performance, such as a synchronized swimming routine. Other types of group gestures, motions or activities can also be analyzed through the detection of collaborative gestures.

It is to be understood that the above-referenced arrangements are illustrative of the application of the principles disclosed herein. It will be apparent to those of ordinary skill in the art that numerous modifications can be made without departing from the principles and concepts of this disclosure, as set forth in the claims.

What is claimed is:

1. An interactive content delivery system, comprising:
a display device, suitable for displaying content to a group of individuals;
a collective gesture detection device, configured to perform operations comprising detecting a respective gesture from each of multiple ones of the individuals and recognizing a collective gesture of the group based on a probabilistic determination that the detected individual gestures collectively constitute the collective gesture; and
a control system, coupled to the display device and the collective gesture detection device, configured to modify the content displayed to the group in response to the recognizing of the collective gesture,
wherein the collective gesture detection device is configured to compute a score indicating a relative quality of the recognized collective gesture.

2. An interactive content delivery system in accordance with claim 1, wherein the display device is a video display device.

3. An interactive content delivery system in accordance with claim 2, further comprising an audio broadcast device, synchronized with the video display device.

4. An interactive content delivery system in accordance with claim 1, wherein the collective gesture detection device comprises:
an imaging device; and
an image analysis computer system coupled to the imaging device, configured to perform the detecting and recognizing operations.

5. An interactive content delivery system in accordance with claim 1, wherein the control system is interconnected to a remote computer system via a communications network, wherein the remote computer system can provide input to the control system and receive feedback from the control system.

6. An interactive content delivery system in accordance with claim 1, wherein the displayed content includes a prompt for a common group gesture.

7. An interactive content delivery system in accordance with claim 6, wherein the common group gesture comprises a selecting action for alternative display content.

8. An interactive content delivery system in accordance with claim 1, wherein the displayed content includes a prompt requesting competing common group gestures from at least two subgroups of the group.

9. An interactive content delivery system in accordance with claim 1, wherein the modified content includes a characterization of the group gesture.

10. A method, comprising:
on a display device, displaying content to a group of individuals;
detecting a respective gesture from each of multiple ones of the individuals;
recognizing a collective gesture of the group based on a probabilistic determination that the detected individual gestures collectively constitute the collective gesture;
modifying the content displayed to the group in response to the recognizing of the collective gesture; and computing a score indicating a relative quality of the recognized collective gesture.

\* \* \* \* \*